(12) United States Patent
Koike et al.

(10) Patent No.: US 10,354,073 B2
(45) Date of Patent: Jul. 16, 2019

(54) INFORMATION PROCESSOR DEVICE VERIFYING SOFTWARE AND METHOD OF CONTROLLING INFORMATION PROCESSOR DEVICE

(71) Applicant: Kabushiki Kaisha Toshiba, Minato-ku (JP)

(72) Inventors: Ryuiti Koike, Kawasaki (JP); Mikio Hashimoto, Tokyo (JP); Naoko Yamada, Yokohama (JP); Ryotaro Hayashi, Hiratsuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 190 days.

(21) Appl. No.: 15/222,060

(22) Filed: Jul. 28, 2016

(65) Prior Publication Data

US 2017/0032126 A1    Feb. 2, 2017

(30) Foreign Application Priority Data

Jul. 30, 2015   (JP) .................. 2015-150589

(51) Int. Cl.
*G06F 9/445*   (2018.01)
*G06F 21/57*   (2013.01)
(Continued)

(52) U.S. Cl.
CPC ............ *G06F 21/572* (2013.01); *G06F 8/656* (2018.02); *G06F 9/4401* (2013.01);
(Continued)

(58) Field of Classification Search
CPC ............ G06F 21/572; G06F 2221/033; G06F 2221/2115; G06F 2221/2141; G06F 8/656; G06F 9/4401
See application file for complete search history.

(56) References Cited

U.S. PATENT DOCUMENTS 6,986,052 B1 *   1/2006   Mittal ................ G06F 12/1441
                                                       713/190
2004/0105548 A1   6/2004   Fujiwara et al.
(Continued)

FOREIGN PATENT DOCUMENTS

JP    2002-073360 A    3/2002
JP    2004-164491      6/2004
(Continued)

*Primary Examiner* — Fahmida Rahman
(74) *Attorney, Agent, or Firm* — Oblon, McClelland, Maier & Neustadt, L.L.P.

(57) ABSTRACT

According to one embodiment, an information processing device includes a processor, a nonvolatile memory, a designation unit, and a controller. The nonvolatile memory stores the first software and the second software which is used as substitute for the first software. The designation unit designates software to be executed by the processor at a boot. The controller protects an area of the nonvolatile memory storing the first software from being written while the first software is executed by the processor. When third software is executed by the processor, the third software verifies the second software. When the second software is legal in a result of verifying by the third software, the designation unit designates the second software.

16 Claims, 11 Drawing Sheets

(51) Int. Cl.
*G06F 8/656* (2018.01)
*G06F 9/4401* (2018.01)

(52) U.S. Cl.
CPC ............... *G06F 2221/033* (2013.01); *G06F 2221/2115* (2013.01); *G06F 2221/2141* (2013.01)

(56) References Cited

U.S. PATENT DOCUMENTS

| | | | |
|---|---|---|---|
| 2005/0273588 A1* | 12/2005 | Ong | G06F 11/1417 713/2 |
| 2007/0180536 A1 | 8/2007 | Kanai | |
| 2010/0100720 A1* | 4/2010 | Wu | G06F 11/1417 713/2 |
| 2011/0087870 A1* | 4/2011 | Spangler | G06F 21/554 713/2 |
| 2011/0131447 A1 | 6/2011 | Prakash et al. | |
| 2013/0073851 A1 | 3/2013 | Hashimoto et al. | |
| 2014/0025940 A1 | 1/2014 | Giraud et al. | |
| 2015/0199190 A1* | 7/2015 | Spangler | G06F 8/654 713/2 |
| 2016/0226843 A1 | 8/2016 | Koike et al. | |

FOREIGN PATENT DOCUMENTS

| | | |
|---|---|---|
| JP | 2005-148495 | 6/2005 |
| JP | 2006-309688 | 11/2006 |
| JP | 2006-323776 | 11/2006 |
| JP | 2007-272923 | 10/2007 |
| JP | 2009-37467 | 2/2009 |
| JP | 2011-118873 | 6/2011 |
| JP | 2013-69053 | 4/2013 |
| JP | 2014-29688 | 2/2014 |
| JP | 2014-95959 | 5/2014 |
| JP | 2014-191658 | 10/2014 |
| JP | 2014-191659 | 10/2014 |
| JP | 2016-144040 | 8/2016 |

\* cited by examiner

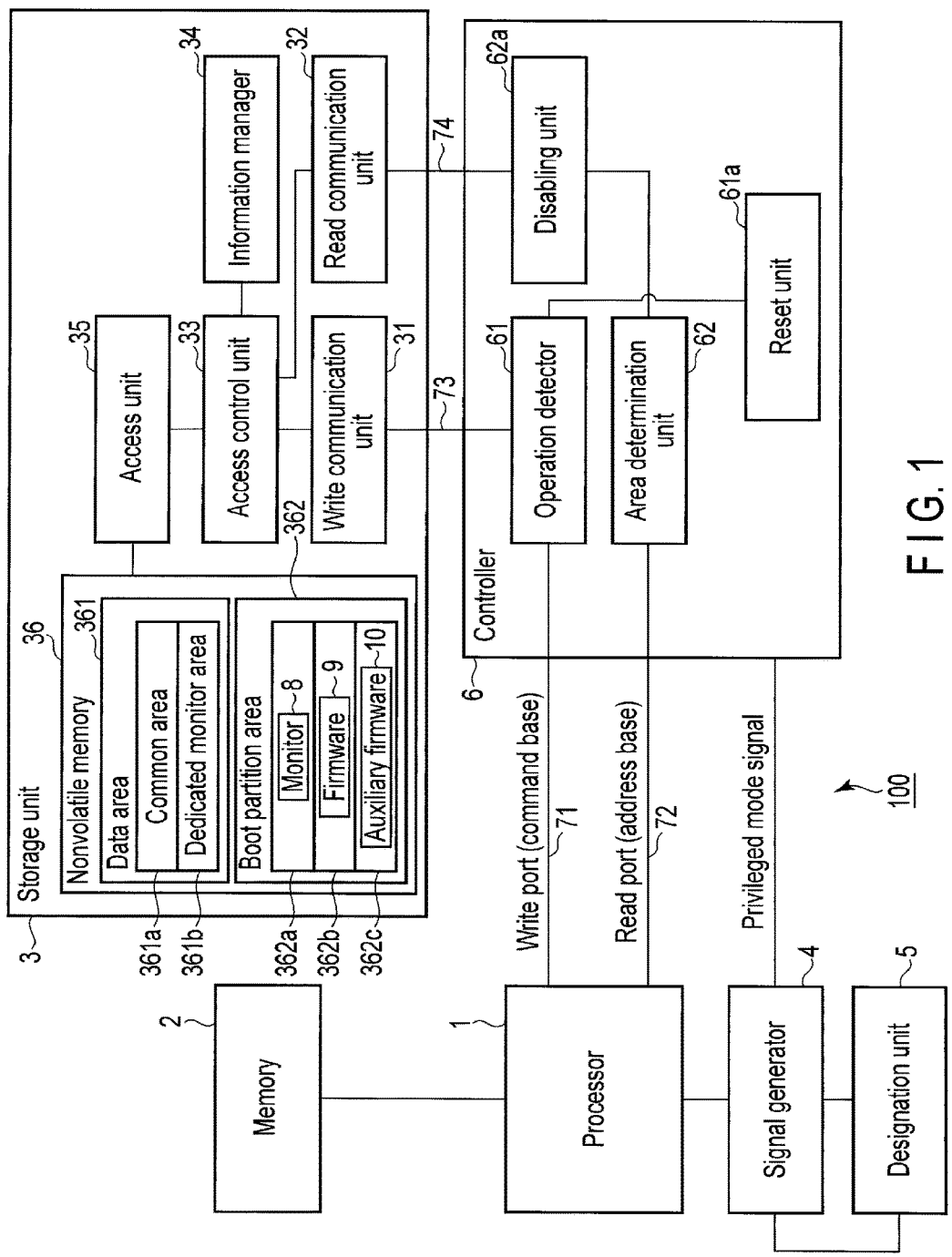
F I G. 1

| Area \ Executing software | Boot partition area | | | Data area | |
|---|---|---|---|---|---|
| | Monitor area | Firmware area | Auxiliary firmware area | Common area | Dedicated monitor area |
| Monitor | R | RW | RW | RW | RW |
| Firmware | X | R | RW | RW | X |
| Auxiliary firmware | X | RW | R | RW | X |

F I G. 2

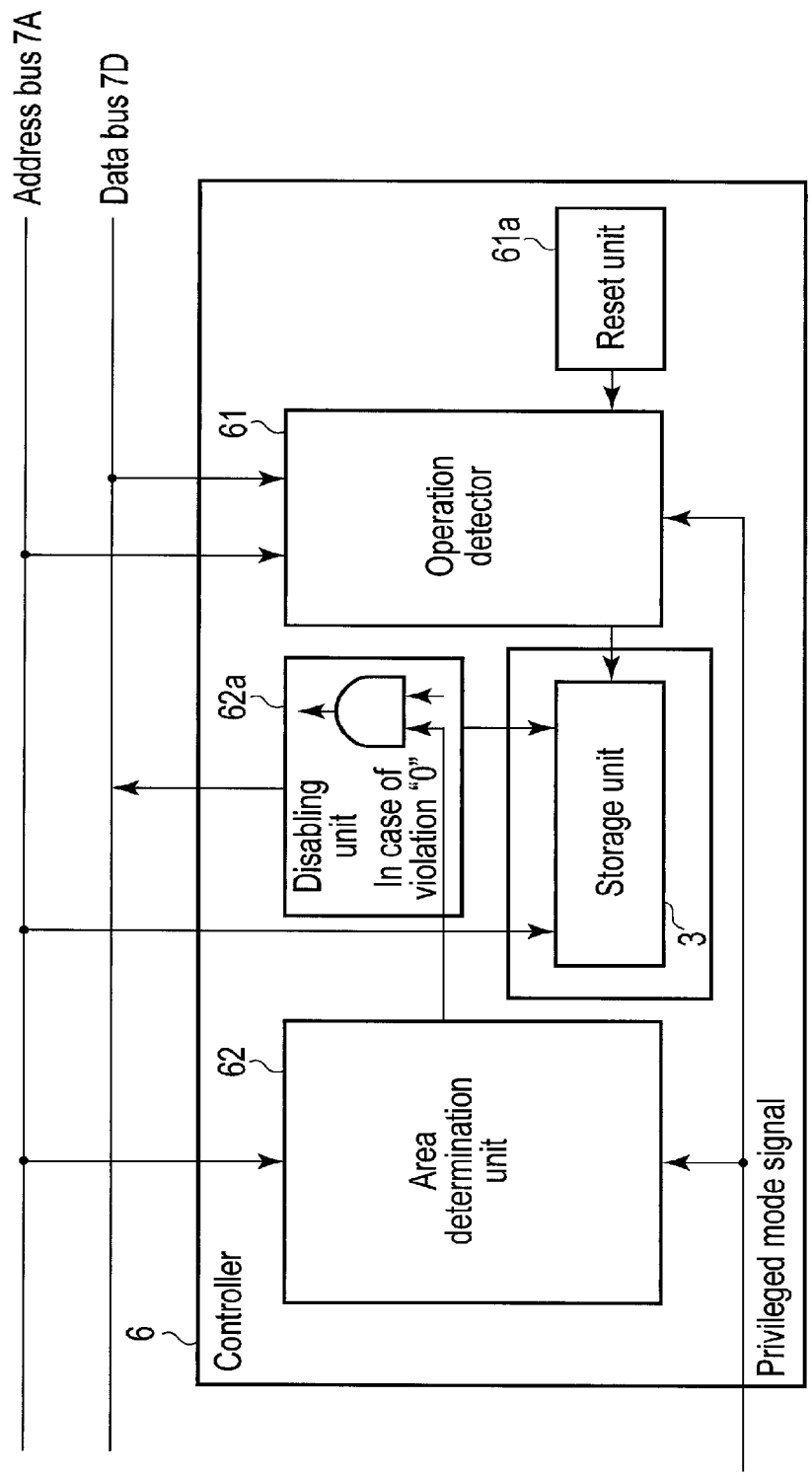
F I G. 3

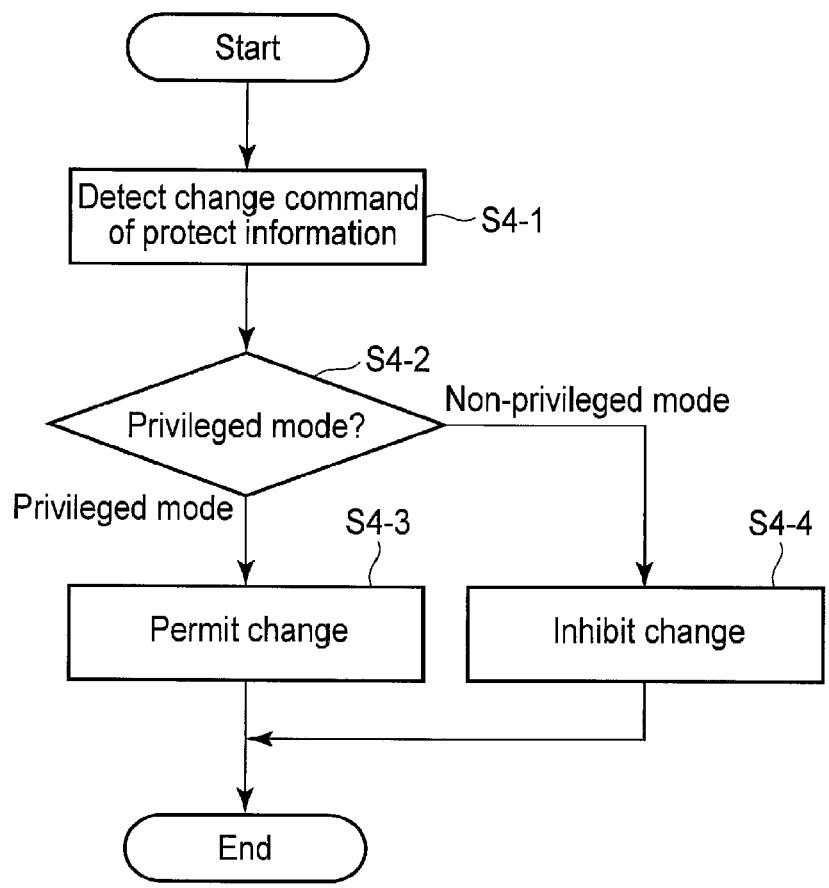
F I G. 4

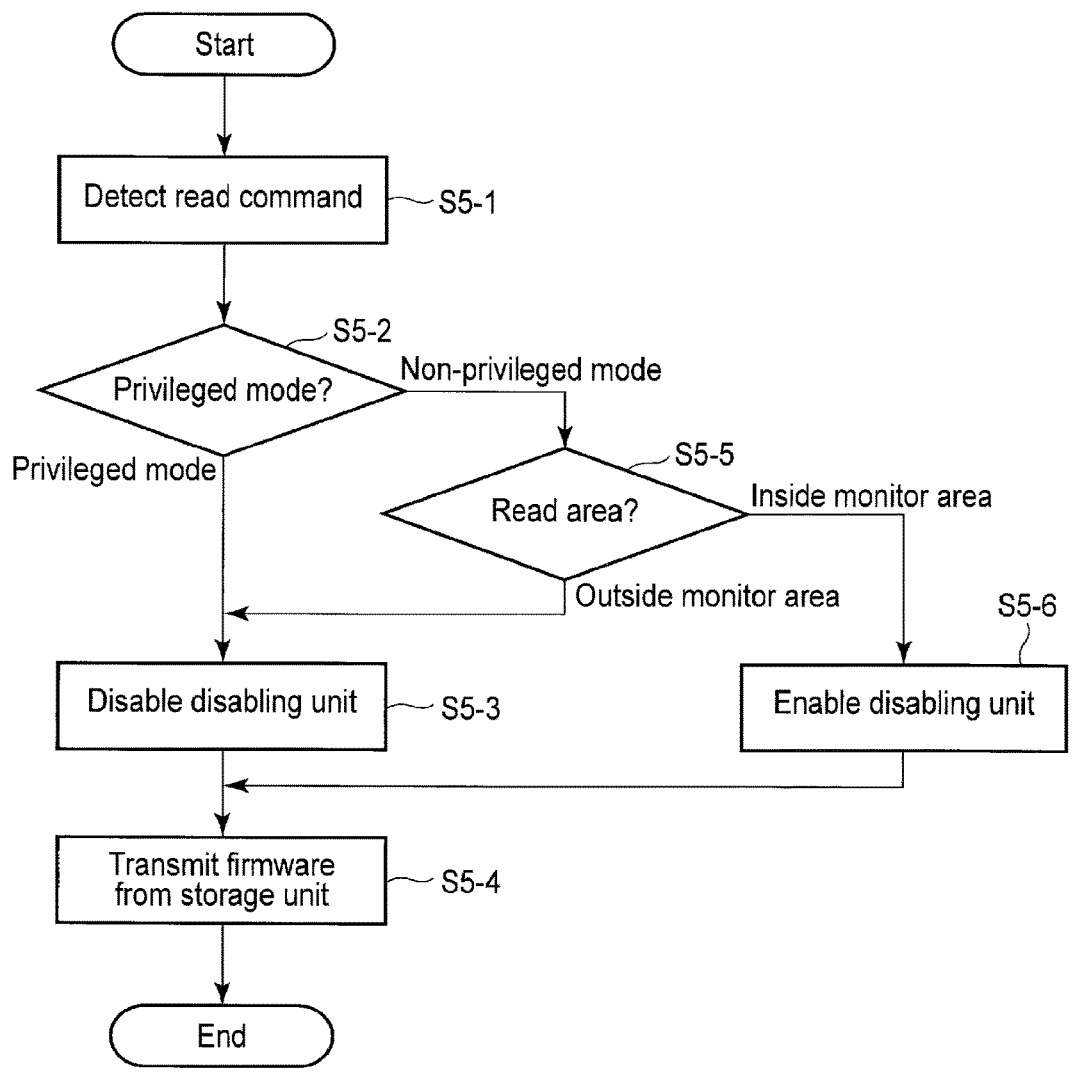
F I G. 5

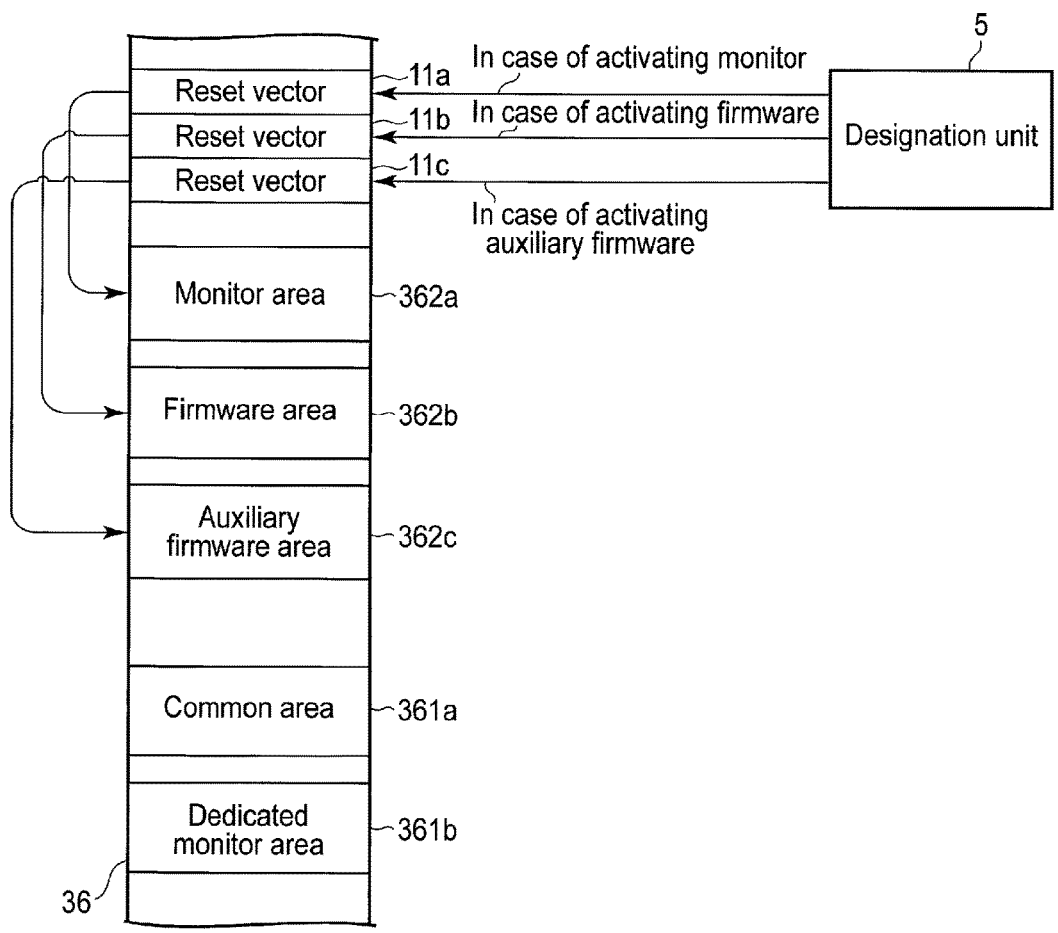
F I G. 7

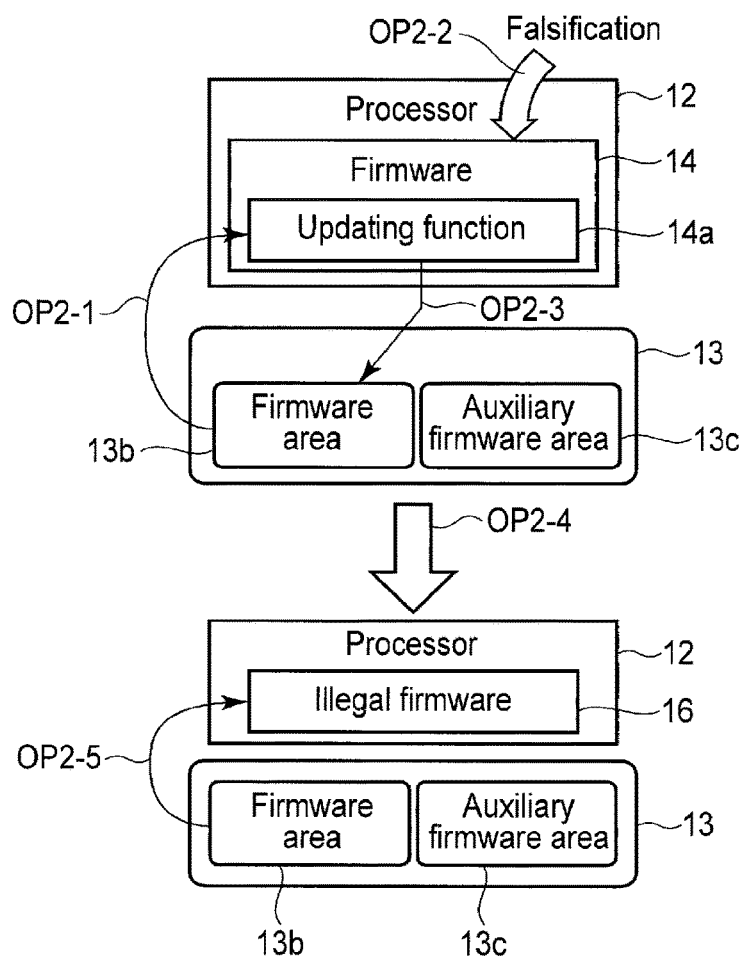
F I G. 11

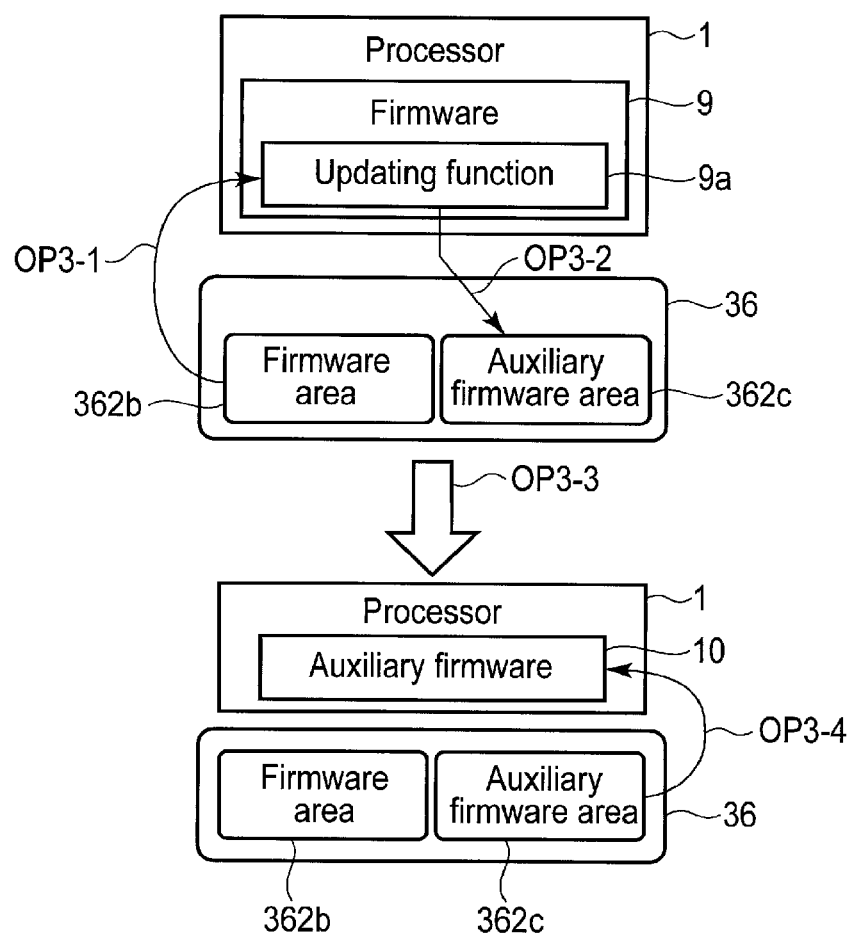
F I G. 12 ated by the processor at a boot. The controller protects the first area of the nonvolatile memory storing the first software from being written while the first software is executed by the processor. When third software is executed by the processor, the third software verifies the second software. When the second software is legal in a result of verifying by the third software, the designation unit designates the second software.

INFORMATION PROCESSOR DEVICE VERIFYING SOFTWARE AND METHOD OF CONTROLLING INFORMATION PROCESSOR DEVICE

CROSS-REFERENCE TO RELATED APPLICATIONS

This application is based upon and claims the benefit of priority from Japanese Patent Application No. 2015-150589, filed Jul. 30, 2015, the entire contents of which are incorporated herein by reference.

FIELD

Embodiments described herein relate generally to an information processing device, a controller and a method of controlling the information processing device.

BACKGROUND

In an information processing device capable of communicating with other devices via a network, firmware is updated in order to overcome vulnerability or fix a bug.

BRIEF DESCRIPTION OF THE DRAWINGS

FIG. 1 is a block diagram showing an example of a configuration of an information processing device according to a present embodiment.

FIG. 2 is a table showing an example of a relationship between each area of a nonvolatile memory and access control of a monitor, firmware and auxiliary firmware in the present embodiment.

FIG. 3 is a block diagram showing an example of a configuration of a controller according to the present embodiment.

FIG. 4 is a flowchart showing an example of processing executed by an operation detector according to the present embodiment.

FIG. 5 is a flowchart showing an example of processing executed by an area determination unit according to the present embodiment.

FIG. 7 is a block diagram showing an example of designation of a boot area by a designation unit according to the present embodiment.

FIG. 11 is a block diagram showing an example of an illegal firmware update in the general information processing device.

FIG. 12 is a block diagram showing an example of a firmware update in the information processing device according to the present embodiment.

DETAILED DESCRIPTION

Figure 6:
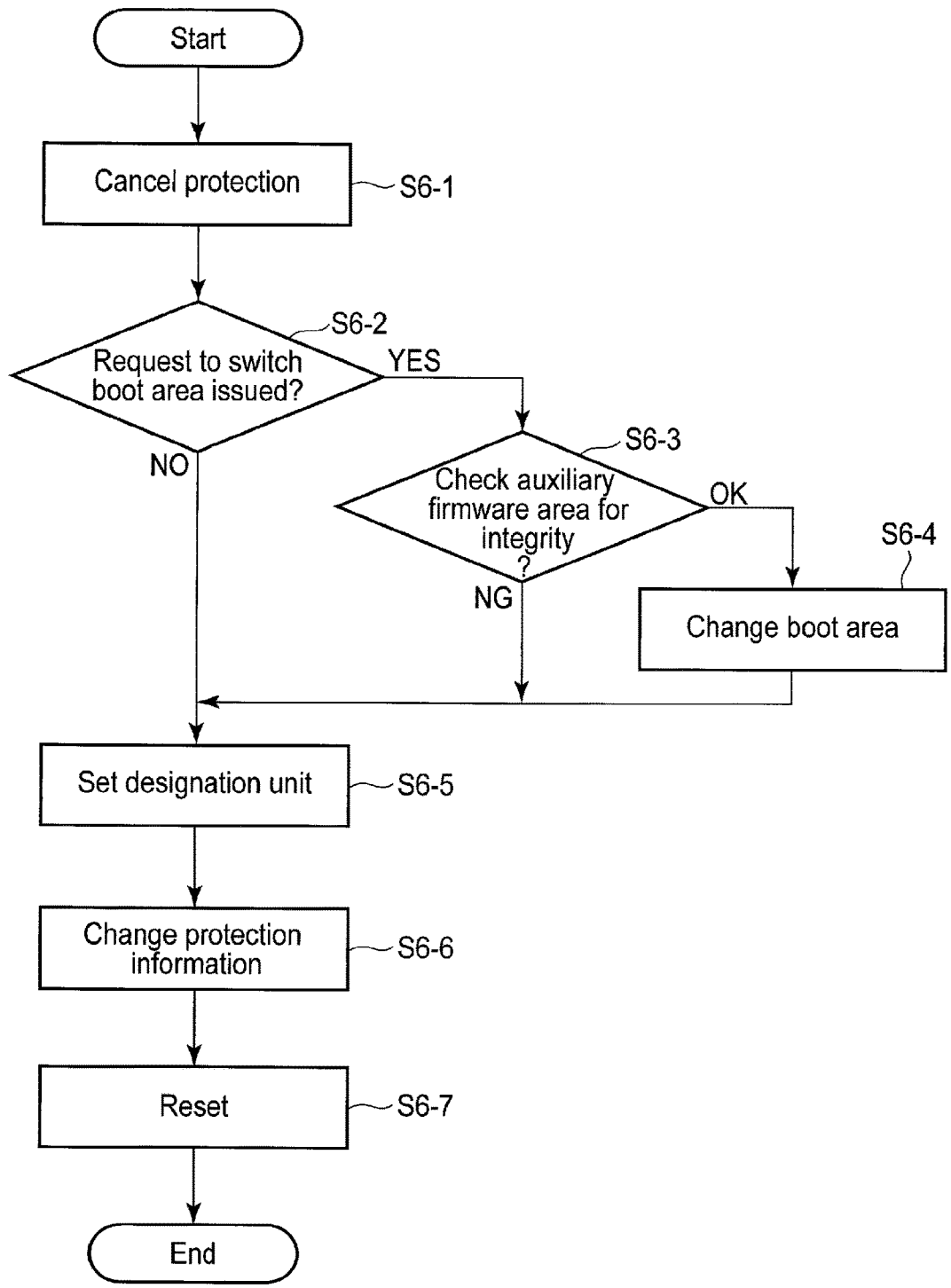
FIG. 6 is a flowchart showing an example of processing executed by a monitor according to the present embodiment.

In general, according to one embodiment, an information processing device includes a processor, a nonvolatile memory, a designation unit, and a controller. The nonvolatile memory includes a first area and a second area. The first area stores first software. The second area stores second software which is used as substitute for the first software. The designation unit designates software to be executed by the processor at a boot. The controller protects the first area of the nonvolatile memory storing the first software from being written while the first software is executed by the processor. When third software is executed by the processor, the third software verifies the second software. When the second software is legal in a result of verifying by the third software, the designation unit designates the second software.

Embodiments will be hereinafter described with reference to the accompanying drawings. In the description below, the substantially same functions and components are denoted by the same reference numbers and their description is provided as necessary.

[First Embodiment]

An information processing device of the present embodiment is, for example, an embedded device, a server machine, a client machine, a personal computer, a smart meter, a vehicle, a copier, a storage device or a storage system, but is not limited to them. Software executed in the information processing device may have vulnerability. In order to overcome the vulnerability, software stored in a nonvolatile memory is often updated. If an updating function for updating software is provided, there is a possibility that vulnerable software stores falsified (or compromised) software in the nonvolatile memory by using the updating function and the falsified software causes an abnormality. That is, the updating function is necessary for overcoming the vulnerability of software but may be abused to falsify the nonvolatile memory.

Elimination of software vulnerability and avoidance of threat are important to security. If software vulnerability is difficult to eliminate, it is essential to minimize damage.

An information processing device of the present embodiment can update software safely and prevent illegal writing of software to the nonvolatile memory.

In the present embodiment, firmware is described as an example of a target to be protected and a target to be written to, read from and erased from the nonvolatile memory. However, the target to be protected and the target to be written to, read from and erased from the nonvolatile memory may be software other than firmware, for example, various programs such as an operating system (OS) and an application program, program code, a program image, data, a data image, information and a document.

The information processing device of the present embodiment includes a monitor area, a firmware area and an auxiliary firmware area in the nonvolatile memory, and stores monitoring firmware called a monitor in the monitor area. The monitor may be software other than firmware.

If the monitor is executing (operating) in the information processing device, a privileged mode (monitor mode) is set with respect to the nonvolatile memory. In the information processing device, for example, setting as to whether each area in the nonvolatile memory is write-protected or writable can be changed only in the privileged mode. In the information processing device in the privileged mode, the firmware area storing currently executing firmware is write-protected and thereby falsification is avoided. In contrast, the auxiliary firmware area storing updated firmware (hereinafter referred to as auxiliary firmware) is writable even by an unauthorized third party. An area used for a boot after a reset is called a boot area. The boot area can be changed by the monitor. In the present embodiment, the monitor executes signature verification for the auxiliary firmware area. If the result of verification shows authenticity, the boot area is changed from the firmware area to the auxiliary firmware area. Activation of unexpected firmware is thereby prevented.

FIG. 1 is a block diagram showing an example of a configuration of the information processing device according to the present embodiment.

The information processing device 100 comprises a processor 1, a memory 2, a storage unit 3, a signal generator 4, a designation unit 5 and a controller 6.

The processor 1 is connected to the other blocks via signal lines (buses). More specifically, buses 71 and 72 connect the processor 1 to the controller 6. Buses 73 and 74 connect the controller 6 to the storage unit 3. Buses 71 and 73 are buses for command reception. Buses 74 and 72 are buses for software transmission. As the processor 1, for example, a central processing unit (CPU), a microprocessing unit (MPU) or a digital signal processor (DSP) is used. Buses 71 to 74 include, for example, an address bus 7A and a data bus 7D as shown in FIG. 3 to be described later.

The processor 1 executes control and arithmetic processing based on firmware stored in at least one of the memory 2 and the storage unit 3.

The memory 2 is a main storage unit under the control of the processor 1. The memory 2 includes, for example, a static random access memory (SRAM) or a dynamic random access memory (DRAM). For example, at a boot of the information processing device 100, any one of firmware stored in a boot partition area 362 is executed under the control of the processor 1, and generated data, etc., is temporarily stored in the memory 2 under the control of the processor 1.

In the present embodiment, the storage unit 3 includes a nonvolatile memory 36, a write communication unit 31, an access control unit 33, an access unit 35, an information manager 34 and a read communication unit 32. The write communication unit 31 and the read communication unit 32 of the storage unit 3 are connected to the controller 6 via buses 73 and 74. In a general configuration, the storage unit 3 is directly controlled by the processor 1. In the present embodiment, however, characteristic peripheral circuits, i.e., the signal generator 4, the designation unit 5 and the controller 6 are provided outside the storage unit 3. Since these peripheral circuits execute access control of the storage unit 3, a safe firmware update can be realized.

The storage unit 3 may include a solid-state drive (SSD), a hard disk drive (HDD) or a hybrid memory unit which is a combination of SSD and HDD.

The nonvolatile memory 36 includes, for example, a NAND flash memory. However, the nonvolatile memory 36 may include a NOR flash memory, a magnetoresistive random access memory (MRAM), a phase-change random access memory (PRAM), a resistive random access memory (ReRAM), a ferroelectric random access memory (FeRAM) or the like.

The write communication unit 31 corresponds to a write port which receives a command to write, a command to erase or a command to change protection information.

In the case of writing, the write communication unit 31 receives a write command from the processor 1 via bus 71, the controller 6 and bus 73, and transmits the received write command to the access control unit 33.

In the case of changing protection information, the write communication unit 31 receives a change command from the processor 1 via bus 71, the controller 6 and bus 73, and transmits the received change command to the access control unit 33.

The access unit 35 writes firmware to or erases firmware from the nonvolatile memory 36 under the control of the access control unit 33. The access unit 35 also reads firmware from an area of the nonvolatile memory 36 indicated by a designated address under the control of the access control unit 33 and transmits the read firmware to the access control unit 33.

The firmware is actually read from, written to and erased from the nonvolatile memory 36 by the access unit 35.

When overwriting an area to which firmware has been already written in the case where the nonvolatile memory 36 is a flash memory, the access unit 35 erases the firmware in the area per block and writes new firmware per page. For example, in the case where data cannot be updated unless a corresponding area is erased as in a flash memory, illegal erasing may be limited instead of an illegal update. However, data can be updated without erasing a corresponding area in some flash memories. Therefore, in the present embodiment, the authenticity of both the write command and the erase command is determined in order to avoid illegal writing to the nonvolatile memory.

For example, the read communication unit 32 corresponds to a read port which receives designation of an address to be read per word and transmits arbitrary read firmware.

In the case of reading, the read communication unit 32 receives an address from the processor 1 via bus 72, the controller 6 and bus 74, and transmits the received address to the access control unit 33. The read communication unit 32 receives firmware corresponding to the address read from the nonvolatile memory 36 via the access unit 35 and the access control unit 33, and transmits the received firmware to the processor 1 via bus 74, the controller 6 and bus 72.

The information manager 34 includes protection information (flag) and manages it. The protection information is information for write and erase protection of the nonvolatile memory 36. If the protection information indicates a protected state, a corresponding area of the nonvolatile memory 36 is write- and erase-protected. The protection information indicates whether to write- and erase-protect in an arbitrary unit of area such as a block unit.

The information manager 34 changes the protection information under the control of the access control unit 33.

The access control unit 33 interprets a command received from the write communication unit 31 or the read communication unit 32 and controls the access unit 35 or the information manager 34.

For example, in response to a write or erase command received from the write communication unit 31, the access control unit 33 causes the access unit 35 to write firmware to the nonvolatile memory 36 or erase an area.

For example, in response to a read command and an address received from the read communication unit 31, the access control unit 33 causes the access unit 35 to read firmware stored in an area of the nonvolatile memory 36 corresponding to the address, receives the firmware from the access unit 35 and transmits the firmware to the read communication unit 32.

In the present embodiment, if a request to write or erase an area corresponding to protection information indicating a protected state is issued, the access control unit 33 write- or erase-protects the area. If a request to write or erase an area corresponding to protection information indicating an unprotected state is issued, the access control unit 33 transmits the write or erase request to the access unit 35.

Further, in the present embodiment, the access control unit 33 interprets a change command received from the read communication unit 32 and changes the protection information included in the information manager 34 based on the result of interpretation.

The change command is received by the write communication unit 31 in the present embodiment, but may be received by the read communication unit 32.

The change command is transmitted from the write communication unit 31 to the access control unit 33 in the present embodiment, but may be transmitted from the write communication unit 31 or the read communication unit 32 to the information manager 34.

The nonvolatile memory 36 stores firmware. In the present embodiment, the nonvolatile memory 36 includes a data area 361 and a boot partition area 362.

Each of the data area 361 and the boot partition area 362 is further divided into small areas. Protection information is set and access control is executed for each area of the nonvolatile memory 36.

The boot partition area 362 is an area storing firmware executed by the information processing device 100. The boot partition area 362 includes, for example, a monitor area 362a, a firmware area 362b and an auxiliary firmware area 362c. The monitor area 362a stores a monitor 8. The firmware area 362b stores firmware 9. The auxiliary firmware area 362c stores auxiliary firmware 10. The information processing device 100 can be booted based on any one of the monitor 8, the firmware 9 and the auxiliary firmware 10 stored in the monitor area 362a, the firmware area 362b and the auxiliary firmware area 362c, respectively.

The monitor 8 is small-scale and highly-reliable monitoring firmware which makes preparations for a boot including a verification of the auxiliary firmware 10. In order to protect the monitor 8, the monitor area 362a is set as an area that is readable by the monitor 8 only in the privileged mode.

It is assumed that the monitor 8 does not have vulnerability differently from the updatable and complicated firmware 9. The monitor 8 is a small and simple code which executes limited particular processes and receives almost no external input in order to eliminate vulnerability. The monitor area 362a is a reliable protected area which stores the monitor 8 and cannot be updated to assure safety. The monitor area 362a is readable in the case of executing the monitor 8 because the monitor 8 should be read by the processor 1. In other cases, however, the monitor area 362a is not readable. The access control of the monitor area 362a is executed by the controller 6.

The monitor 8 is executed based on a reset of the information processing device 100. The monitor 8 can execute the following first to fourth processes.

The first process is a verification of the auxiliary firmware area 362c. In the first process, the auxiliary firmware 10 stored in the auxiliary firmware area 362c is verified for integrity and authenticity by using a public key included in the monitor 8.

The second process is a change of access control setting of the nonvolatile memory 36.

The third process is switching of the boot partition area 362. In the third process, the designation unit 5 is operated to designate firmware of any one of the firmware area 362b and the auxiliary firmware area 362c as firmware to be activated at the next boot.

The fourth process is a reset for activating the designated firmware.

At the time of the reset, the monitor 8 determines whether a request to switch the boot area is issued by the executing firmware 9 (i.e., whether a request to switch the executing firmware 9 to the auxiliary firmware 10 is issued).

If the request to switch the boot area is issued, the monitor 8 executes the first to fourth processes.

If there is no request in particular, the monitor 8 executes the third and fourth processes and activates the firmware 9 in the boot area.

The firmware 9 executed by the processor 1 writes to a common area 361a in the nonvolatile memory 36. Information that designates firmware stored in any one of the firmware area 362b and the auxiliary firmware area 362c as firmware to be activated is stored in, for example, the dedicated monitor area 361b.

The firmware area 362b stores firmware 9 which is currently set as a target to be executed. During the execution of the firmware 9 stored in the firmware area 362b, the firmware area 362b is write-protected. As a result, even if the vulnerability of the updating function of the firmware 9 is abused to update the executing firmware 9, the firmware 9 cannot be updated. The safety of the executing firmware 9 is therefore assured. At the time of the next boot, the same code as the executing firmware 9 is activated certainly.

The auxiliary firmware area 362c stores the auxiliary firmware 10 which is updated by the updating function of the executing firmware 9 and used as substitute for the firmware 9. After the auxiliary firmware 10 is stored in the auxiliary firmware area 362c, the auxiliary firmware 10 is verified by the monitor 8 and then enabled.

The firmware area 362b may be interchanged with the auxiliary firmware area 362c when the monitor 8 enables the auxiliary firmware 10 stored in the auxiliary firmware area 362c. In this case, auxiliary firmware generated at the next update may be stored in the auxiliary firmware area after the interchange.

The data area 361 is an area dedicated to data and includes a common area 361a and a dedicated monitor area 361b.

The common area 361a is readable and writable by the monitor 8, the firmware 9 and the auxiliary firmware 10. The dedicated monitor area 361b is an area dedicated to the monitor 8. The dedicated monitor area 361b is readable and writable only by the monitor 8 and is not readable and not writable by the firmware 9 and the auxiliary firmware 10. For example, boot partition information is stored in the dedicated monitor area 361b. The boot partition information is information that designates the boot area and is updated by a firmware verifying function of the monitor 8 to be described later.

In the present embodiment, the nonvolatile memory 36 may include memories. For example, the nonvolatile memory 36 may include a first and second memories. The first memory may include the common area 361a, dedicated monitor area 361b, firmware area 362b, auxiliary firmware area 362c. The second memory may include the monitor area 362a. The second memory may be a mask read-only-memory.

The monitor area 362a may be a non-rewritable area in the nonvolatile memory 36.

Upon activation of the monitor 8, the signal generator 4 generates a privileged mode signal and transmits the privileged mode signal to the controller 6. In the description below, a state where a target to be executed by the processor 1 is the monitor 8 is referred to as a privileged mode.

The signal generator 4 may be realized by, for example, a register. Once the privileged mode, the signal generator 4 continues outputting the same signal until the next setting change. The signal generator 4 may be configured to switch between the privileged mode and the non-privileged mode only at the timing of reset.

The privileged mode signal is used in the controller 6 as a control signal for determining whether the monitor 8 is executing.

The designation unit 5 designates firmware of any one of the areas in the boot partition area 362 as firmware to be used for a boot, for example, after input of a particular signal (reset signal). If a reset signal is generated in a general information processing device, an area of the nonvolatile memory indicated by a specific address is referred based on a single reset vector, and firmware stored in the area indicated by the specific address is activated. In contrast, in the present embodiment, a reset vector to be referred by the processor 1 is switched according to a value of the designation unit 5, and a boot area used for a boot is switched between the monitor area 362a, the firmware area 362b and the auxiliary firmware area 362c.

If the designation unit 5 designates the monitor area 362a storing the monitor 8 immediately after a reset, the privileged mode signal is output from the signal generator 4. The privileged mode signal is continuously output until a reset is performed, i.e., while the monitor 8 is executing.

However, if the executing firmware 9 is allowed to update setting of the designation unit 5, the auxiliary firmware 10 stored in the auxiliary firmware area 362c may be activated without being verified by the monitor 8. Therefore, the designation unit 5 keeps the value indicating the firmware 9 (i.e., continues designating the firmware 9 as the boot area) in spite of a reset only in the case where the reset is performed during the output of the privileged mode. That is, only the monitor 8 can switch the next boot area. If a reset is performed but the privileged mode signal is not output, the designation unit 5 designates the monitor area 362a and the monitor 8 is activated. The monitor 8 is activated whenever the firmware 9 is reset. Therefore, the auxiliary firmware 10 is always enabled after the privileged mode.

The controller 6 is an access control circuit which controls reading from the storage unit 3 and writing to the storage unit 3. The controller 6 is provided at a stage prior to the storage unit 3. The controller 6 corresponds to a wrapped logic unit and includes an operation detector 61, an area determination unit 62, a reset unit 61a and a disabling unit 62a.

The controller 6 determines whether to execute access control based on the privileged mode signal received from the signal generator 4. During the execution of the monitor 8, the controller 6 receives the privileged mode signal from the signal generator 4. The controller 6 permits the monitor 8 to change the access control setting only in the case of receiving the privileged mode signal. The setting by the monitor 8 is effective even after the firmware 9 is activated and is maintained until the monitor 8 changes the setting again. Therefore, the controller 6 write-protects a specified area of the nonvolatile memory 36 in accordance with the previously made correct access control setting even if the privileged mode signal is not received.

The controller 6 can refer to an address bus and a data bus used when the processor 1 reads from and writes to the nonvolatile memory 36. The controller 6 executes necessary access control by monitoring input and output of the address bus and the data bus.

The operation detector (for example, controller) 61 detects a series of operations at the time of writing. In the present embodiment, for example, the operation detector 61 executes control for inhibiting protection information from being modified in the non-privileged mode.

The area determination unit (for example, read control unit) 62 detects a series of operations at the time of reading. In the present embodiment, for example, the area determination unit 62 executes control for inhibiting the monitor 8 from being read in a particular condition to ensure protection of the monitor 8.

The reset unit 61a transmits a reset signal to the storage unit 3 via the operation detector 61 and bus 73 when resetting the storage unit 3. For example, when a change of protection information is requested in the non-privileged mode, the reset unit 61a resets the storage unit 3 to disable the change.

The disabling unit 62a limits operation to the storage unit 3 when reading is detected by the area determination unit 62. For example, in the non-privileged mode, the disabling unit 62a disables a value of the monitor 8 read from the monitor area 362a by forcibly zeroing the value.

FIG. 2 is a table showing an example of a relationship between each area of the nonvolatile memory and access control of the monitor 8, the firmware 9 and the auxiliary firmware 10 in the present embodiment.

During the execution of the monitor 8, the monitor area 362a is readable but not writable by the monitor 8, and the firmware area 362b, the auxiliary firmware area 362, the common area 361a and the dedicated monitor area 361b are readable and writable by the monitor 8.

During the execution of the firmware 9, the monitor area 362a and the dedicated monitor area 361b are not readable and not writable by the firmware 9, the firmware area 362b is readable but not writable by the firmware 9, and the auxiliary firmware area 362c and the common area 361a are readable and writable by the firmware 9.

During the execution of the auxiliary firmware 10, the monitor area 362a and the dedicated monitor area 361b are not readable and not writable by the auxiliary firmware 10, the firmware area 362b and the common area 361a are readable and writable by the auxiliary firmware 10, and the auxiliary firmware area 362c is readable but not writable by the auxiliary firmware 10.

The access control setting of the firmware area 362b can be changed dynamically.

FIG. 3 is a block diagram showing an example of a configuration of the controller 6 of the present embodiment. The access control of the storage unit 3 executed by the controller 6 shown in FIG. 3 is described with reference to FIG. 4 and FIG. 5.

FIG. 4 is a flowchart showing an example of processing executed by the operation detector 61 of the present embodiment.

The operation detector 61 monitors the address bus 7A and the data bus 7D and detects a change command to change protection information (S4-1). In the present embodiment, the change command may be a command sequence input to the address bus 7A and the data bus 7D in a specified order.

If the change command is detected, the operation detector 61 determines whether a privileged mode is set, i.e., whether the monitor 8 is executing based on a privileged mode signal (S4-2).

In the case of the privileged mode, the operation detector 61 permits a change of the protection information and transmits the change command to the storage unit 3 at the subsequent stage (S4-3). In the case of a non-privileged mode, the operation detector 61 inhibits the change (S4-4).

The change is inhibited in various ways depending on the specifications of the storage unit 3, etc. For example, the operation detector 61 may reset the storage unit 3 using the reset unit 61*a*, notify the executing firmware 9 of an exception or resets the information processing device 100 as an abnormal condition regarding security.

FIG. 5 is a flowchart showing an example of processing executed by the area determination unit 62 of the present embodiment.

The area determination unit 62 monitors the address bus 7A and detects a read command (S5-1). If the read command is detected, the area determination unit 62 determines whether the privileged mode is set based on the privileged mode signal (S5-2).

In the case of the privileged mode, the area determination unit 62 disables the disabling unit 62*a* (S5-3), transmits the read command to the storage unit 3 at the subsequent stage, receives firmware corresponding to a read address from the storage unit 3 and transmits the firmware to the processor 1 (S5-4).

In the case of the non-privileged mode, the area determination unit 62 verifies an area (range) to be read (S5-5).

If the area to be read is outside the monitor area 362*a*, the area determination unit 62 disables the disabling unit 62*a* (S5-3) and transmits firmware read from the storage unit 3 to the processor 1 as per the case of the privileged mode. If the area to be read is inside the monitor area 362*a*, the area determination unit 62 enables the disabling unit 62*a* (S5-6), disables the monitor 8 read from the storage unit 3 by the disabling unit 62*a* and transmits the disabled monitor 8 to the processor 1 (S5-4).

The disabling unit 62*a* is a circuit which zeros the value of the monitor 8 obtained from the data bus 7D by, for example, performing an AND operation of the value of the monitor 8 and zero. The disabling unit 62*a* makes the monitor 8 in the monitor area 362*a* substantially unreadable in the non-privileged mode, which ensures protection of the monitor 8.

It should be noted that the disabling unit 62*a* may use other methods for disabling as long as the monitor 8 can made substantially unreadable.

FIG. 6 is a flowchart showing an example of processing executed by the monitor 8 of the present embodiment.

When the monitor 8 is executed by the processor 1, the monitor 8 transmits, to the operation detector 61, a change command to permit a change of the protection information (S6-1). During the execution of the monitor 8, since the operation detector 61 detects the privileged mode signal, the change of the protection information is not disabled.

Next, the monitor 8 determines whether a request to switch a boot area which stores firmware used at a boot is stored by the firmware, for example, in the common area 361*a* (S6-2).

If the request to switch the boot area is stored or if the monitor 8 determines that the boot area should be switched, the verifying function included in the monitor 8 verifies the auxiliary firmware 10 in the auxiliary firmware area 362*c* for integrity and erases the request to switch the boot area stored in the common area 361*a* (S6-3). The auxiliary firmware 10 is stored from the auxiliary firmware area 362*c* to the memory 2 via the processor 1 and undergoes verification for, for example, integrity and authenticity. For example, if firmware is switched but the monitor 8 detects that the firmware has malfunctioned, the monitor 8 determines that the boot area should be switched.

If the verification shows that the auxiliary firmware 10 is OK, the monitor 8 changes the setting information of the boot area stored in the dedicated monitor area 361*b* from the firmware area 362*b* to the auxiliary firmware area 362*c* (S6-4).

If the request to switch the boot area is not stored, if the verification shows that the auxiliary firmware area 362*c* is NG or if the setting of the boot area is changed, the monitor 8 acquires the setting information of the boot area from the dedicated monitor area 361*b* and set the setting information of the boot area to the designation unit 5 (S6-5).

The monitor 8 further instructs the information manager 34 to change the protection information, for example, to set the protection information of the boot area to the protected state (write-protected), as appropriate (S6-6).

After the completion of the above processes, the monitor 8 performs a reset (S6-7).

By the above operation, the verified auxiliary firmware 10 stored in the auxiliary firmware area 362*c* is activated in the write-protected state or the monitor 8 is activated at the next boot.

There is a possibility that the auxiliary firmware 10 malfunctions after the reset. Therefore, the monitor 8 may change the protection information after verifying that the auxiliary firmware 10 operates normally. The normal operation may be variously defined. For example, the auxiliary firmware 10 may be regarded as operating normally on the condition that an IP address is acquired, communication with a server is achieved or the firmware is determined to be the latest version. In such a case, the monitor 8 may include a function of verifying the normal operation before the change of the protection information.

FIG. 7 is a block diagram showing an example of designation of the boot area by the designation unit 5 of the present embodiment.

The nonvolatile memory 36 is divided into areas including the monitor area 362*a*, the firmware area 362*b*, the auxiliary firmware area 362*c*, the common area 361*a* and the dedicated monitor area 361*b*.

The designation unit 5 designates an area of the nonvolatile memory 36 used for the next boot. The nonvolatile memory 36 stores referable reset vectors 11*a* to 11*c*. Reset vector 11*a* corresponds to the monitor area 362*a*. Reset vector 11*b* corresponds to the firmware area 362*b*. Reset vector 11*c* corresponds to the auxiliary firmware area 362*c*. The boot area is switched by switching a reset vector designated by the designation unit 5 at a boot. The boot area can be switched only by the monitor 8.

Figure 8:
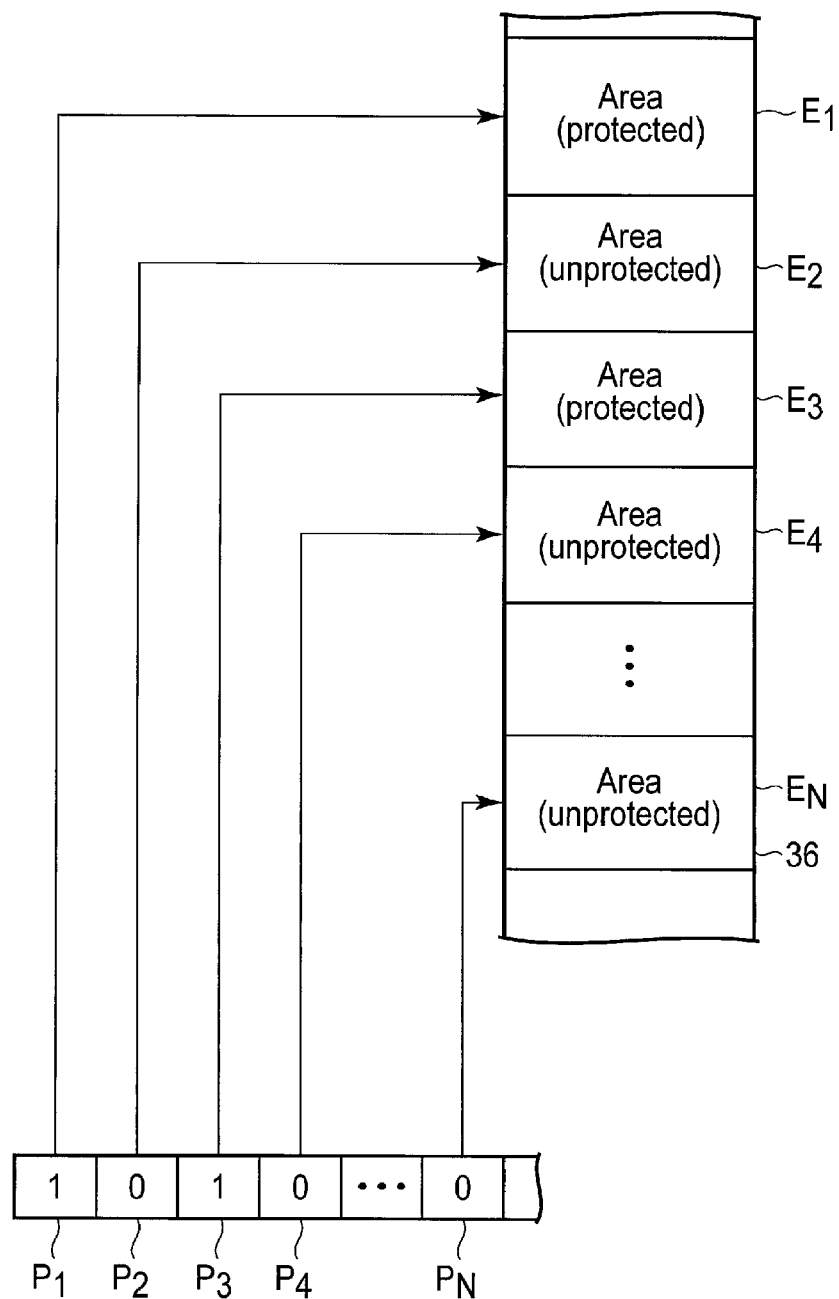
FIG. 8 is a block diagram showing an example of a relationship between each area of the nonvolatile memory and protection information in the present embodiment.

FIG. 8 is a block diagram showing an example of a relationship between each area of the nonvolatile memory 36 and protection information in the present embodiment.

The nonvolatile memory 36 includes areas $E_1$ to $E_N$. Protection information $P_1$ to protection information $P_N$ correspond to the areas $E_1$ to $E_N$, respectively. In FIG. 8, each of protection information $P_1$ to protection information $P_N$ is constituted by one bit and indicates a protected state as flag 1 and an unprotected state as flag 0.

The operation detector 61 of the controller 6 does not directly limit a write command to the storage unit 3. The storage unit 3 includes protection information $P_1$ to $P_N$ to determine whether to execute write protection and executes write and erase protection based on the protection information $P_1$ to $P_N$. The operation detector 61 limits the setting of protection information $P_1$ to $P_N$ to the monitor 8 only and thereby realizes substantive write protection of the storage unit 3. More specifically, before the firmware 9 is activated, the monitor 8 sets the firmware area 362*b* serving as the boot area to the protected state (write-protected) and sets the auxiliary firmware area 362*c* to the unprotected state (writable). By this setting, the firmware area 362b in the protected state storing the activated firmware 9 cannot be updated even if an illegal update of the firmware 9 is tried.

The area in the protected state is changed according to the executing firmware. Therefore, the monitor 8 changes protection information $P_1$ to $P_N$ at proper timing and determines an area to be in the protected state. For example, the monitor 8 executes access control setting prior to a reset for firmware activation.

In a read-limited area such as the monitor area 362a, an address does not necessarily set as long as the read-limited area can be identified.

Figure 9:
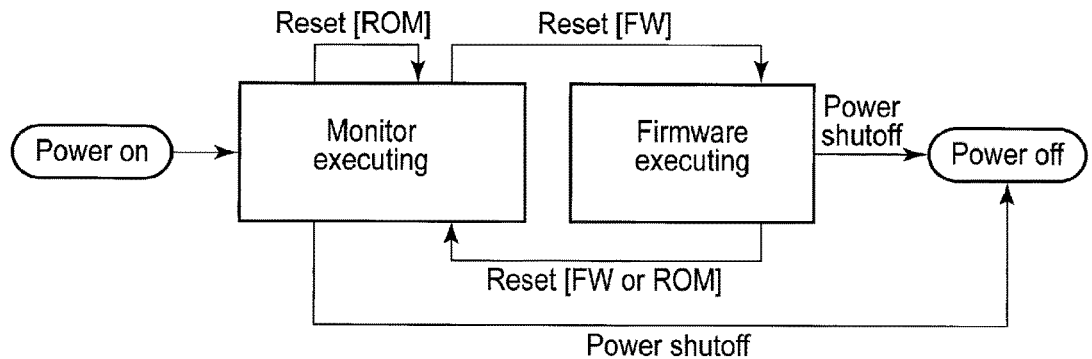
FIG. 9 is a state transition diagram showing an example of transition between a privileged mode and a non-privileged mode in the present embodiment.

FIG. 9 is a state transition diagram showing an example of transition between the privileged mode and the non-privileged mode in the present embodiment.

In FIG. 9, "ROM" indicates the case where the designation unit 5 designates the monitor area 362a and "FW" indicates the case where the designation unit 5 designates the firmware area 362b.

When the power is turned on, the monitor 8 is activated.

If a reset is performed during the execution of the monitor 8 (i.e., during the output of the privileged mode signal) and the designation unit 5 designates the monitor area 362a, the monitor 8 is activated.

If a reset is performed during the execution of the monitor 8 and the designation unit 5 designates the firmware area 362b, the firmware 9 is activated.

If a reset is performed during the execution of the firmware 9 (i.e., during the output of the non-privileged mode signal) and the designation unit 5 designates the monitor area 362a, the monitor 8 is activated.

Even if a reset is performed during the execution of the firmware 9 and the designation unit 5 designates the firmware area 362b, the monitor 8 is activated.

The power can be turned off during the execution of the monitor 9 or the firmware 9.

Immediately after the reset, the designation unit 5 designates reset vector 11a corresponding to the monitor area 362a. Then, the signal generator 4 transmits the privileged mode signal to the controller 6. The privileged mode signal is continuously output until a reset is performed, i.e., while the monitor 8 is executing.

The protection of the firmware 9 implemented in the present embodiment is described below. First, an example of a firmware update and an illegal firmware update in a general information processing device are described with reference to FIG. 10 and FIG. 11, and then software protection of the present embodiment is described with reference to FIG. 12.

Figure 10:
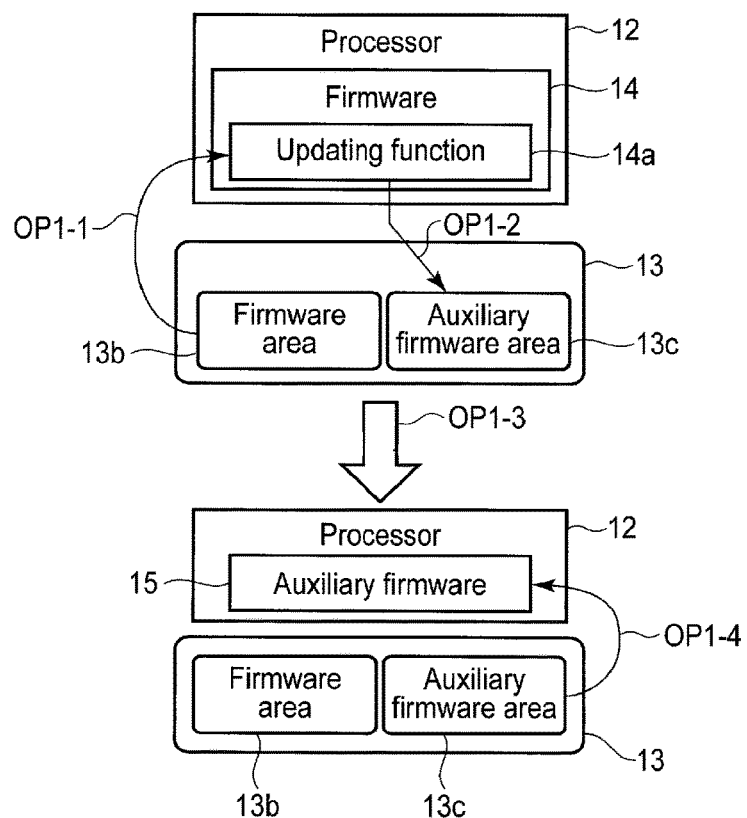
FIG. 10 is a block diagram showing an example of a software update in a general information processing device.

FIG. 10 is a block diagram showing an example of a software update in the general information processing device.

A processor 12 executes firmware 14 stored in a nonvolatile memory 13 directly from the nonvolatile memory 13 by execute in place (XIP), or executes firmware 14 temporarily stored in a memory (OP1-1). For example, if vulnerability of the firmware 14 is found and thus the firmware 14 should be updated, an updating function 14a of the firmware 14 stores auxiliary firmware 15, which is obtained by updating the executing firmware 14, in an auxiliary firmware area 13c (OP1-2). The information processing device may receive the auxiliary firmware 15, for example, from a universal serial bus (USB) memory via a network, or via a universal asynchronous receiver-transmitter (UART), and store the auxiliary firmware 15 in the auxiliary firmware area 13c. After that, the currently executing firmware 14 switches a boot area from a firmware area 13b to the auxiliary firmware area 13c and performs a restart (OP1-3). As a result, the auxiliary firmware 15 from which the vulnerability is removed is executed by the processor 12 after the restart (OP1-4).

FIG. 11 is a block diagram showing an example of an illegal firmware update in the general information processing device.

If the firmware 14 is activated by the processor 12 (OP2-1) and the activated firmware 14 is vulnerable, the firmware 14 may be falsified by an attacker and thus execute illegal processing (OP2-2). The illegal firmware 14 (16) stores illegal firmware 14 (16) such as a back door in the firmware area 13b (OP2-3) and performs a restart (OP2-4). As a result, the illegal firmware 16 stored in the firmware area 13b is executed after the restart (OP2-5). It is also assumed that the illegal firmware 16 is falsified so as to store the illegal firmware 16 in the auxiliary firmware area 13c and activate the illegal firmware 16 stored in the auxiliary firmware area 13c.

There is a possibility that the attacker overwrites the updating function 14a of the firmware 14 with NOP which causes the processor 12 to execute nothing, or skips the updating function 14a of the firmware 14 by a jump instruction in order to keep the vulnerability. In such a case, the operation of the illegal firmware 16 is repeated and it is difficult to return the firmware to the original normal state. There is also a possibility that the attacker overwrites all the areas of the nonvolatile memory 12 to corrupt the firmware or makes the information processing device impossible to boot by corrupting an area storing a boot program.

FIG. 12 is a block diagram showing an example of a firmware update in the information processing device 100 of the present embodiment.

The firmware update of the present embodiment is different from that shown in FIG. 10 and FIG. 11 in that reliable firmware called a monitor 8 executes various processes and determines the authenticity of firmware to be activated next.

The firmware 9 stored in the firmware area 362b is activated by the processor 1 (OP3-1). After that, the updating function 9a stores the auxiliary firmware 10 in the auxiliary firmware area 362c (OP3-2). Then, if the user inputs a reset signal to the information processing device 100, the designation unit 5 designates the monitor area 362a as a boot area.

After a reset, the processor 1 activates the monitor 8 stored in the monitor area 362a (OP3-3).

The integrity verifying function of the monitor 8 verifies the auxiliary firmware 10 stored in the auxiliary firmware area 362c to determine whether integrity and authenticity are secured.

If the verification shows that integrity and authenticity are secured, the monitor 8 sets the firmware area 362b writable and sets the auxiliary firmware area 362c write-protected. Next, the monitor 8 changes the boot area from the firmware area 362b to the auxiliary firmware area 362c and performs a reset again. As a result, the normal auxiliary firmware 10 stored in the auxiliary firmware area 362c is activated (OP3-4). Therefore, the nonvolatile memory 36 can be prevented from being falsified by illegal firmware and a safe firmware update can be realized.

In the present embodiment, firmware can be updated safely and it can be ensured that normal firmware is activated after the information processing device 100 is reset.

The firmware update of the present embodiment has a feature in that the non-privileged mode is switched to the privileged mode and special processes can be executed during the execution of the monitor 8. More specifically, setting of a protected area and an unprotected area (i.e., protection information) and setting of a boot area are allowed to be changed only in the privileged mode. Accordingly, even if abnormal firmware abuses the updating function, falsifies protection information and tries to falsify the auxiliary firmware area 362c, the write-protected attribute of the firmware area 362b is not removed. Therefore, falsification by the abnormal firmware is blocked by the operation detector 61 and the firmware 9 stored in the firmware area 362b is prevented from being updated. The monitor 8 sets protection information corresponding to the firmware area 362b to the protected state before the firmware 9 is activated, thereby preventing the executing firmware 9 from being updated. The auxiliary firmware area 362c is writable based on the operation of the firmware 9. However, the boot area is not changed based on the operation of the firmware 9. Therefore, it is ensured that previously-activated normal firmware 9 is activated at a restart.

The monitor 8 can enable the auxiliary firmware 10 stored in the auxiliary firmware area 362c only after verifying the auxiliary firmware 10. For example, even if illegal firmware is stored in the auxiliary firmware area 362c, activation of the illegal firmware can be avoided by a verification of the firmware by the monitor 8.

In the present embodiment, even if the firmware 9 abnormalized owing to vulnerability tries to read, for example, the monitor 8, the read monitor 8 is disabled by the area determination unit 62, which ensures protection of the monitor 8.

The order of various processes and the configurations described in the present embodiment can be changed as appropriate. For example, the storage unit 3 and the controller 6 are independent modules separated from each other, but may be integrated into a single module as long as it has the same functions. For example, the write communication unit 31 and the read communication unit 32 may be included in the access control unit 33. At least one of the signal generator 4 and the designation unit 5 may be included in the controller 6.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a processor;
a nonvolatile memory comprising a first area, a second area, and a third area, the first area storing first software, the second area storing second software which is used as a substitute for the first software, the third area storing third software, the first and second areas being areas in which the first software in the first area and the second software in the second area are directly executable and rewritable by the processor, the third area being an area in which the third software in the third area is not rewritable by the first and second software;
a controller configured to control a writable state or a write-protected state for each of the first and second areas, the controller protecting the first area of the nonvolatile memory storing the first software from being written while the first software is executed by the processor;
a designation circuit configured to designate software to be executed by the processor; and
a signal generator configured to generate a particular signal for permitting setting for the controller,
wherein the signal generator starts outputting the particular signal to the controller when the designation circuit designates execution of the third software at a boot of the processor,
when the first software is executed by the processor, the first software updates the second software stored in the second area,
when the third software is executed by the processor, the third software verifies the second software, and when the second software is legal in a result of verifying by the third software, the third software sets the second software instead of the first software for the designation circuit, and sets the writable state about the first area and the write-protected state about the second area for the controller, and
the processor executes the first software or the second software designated by the designation circuit after the outputting the particular signal is stopped.

2. The device of claim 1, wherein
the third software
determines whether a request to switch the software to be executed at the boot is generated by the first software when the third software is executed by the processor, and verifies the second software when the request to switch is generated, or when switching is needed.

3. The device of claim 2, wherein
when the second software is legal in the result of verifying by the third software, the third software instructs the controller to protect the second area of the nonvolatile memory storing the second software from being written.

4. The device of claim 1, wherein the processor executes the third software based on a boot or reset of the device, and
the signal generator generates the particular signal during execution of the third software by the processor.

5. The device of claim 4, wherein
the controller determines whether the particular signal is generated,
permits protection information to be changed when the particular signal is generated, the protection information indicating whether areas included in the first nonvolatile memory are writable, and
inhibits the protection information from being changed when the particular signal is not generated.

6. The device of claim 5, wherein
the controller is further configured to disable a request to change the protection information when the particular signal is not generated and the request to change the protection information is issued.

7. The device of claim 1, wherein
the third area is a non-rewritable area included in the nonvolatile memory.

8. The device of claim 4, wherein
the nonvolatile memory comprises a first nonvolatile memory and a second nonvolatile memory,
the first nonvolatile memory comprises the first and second areas,
the second nonvolatile memory comprises the third area,
the second nonvolatile memory stores the third software, and is included in the first nonvolatile memory or is different from the first nonvolatile memory, and
the controller is further configured to inhibit the third software from being read from the second nonvolatile memory when receiving of the particular signal is stopped.

9. The device of claim 8, wherein
the controller is further configured to zero a value of the third software when the particular signal is not generated and the third software is read.

10. The device of claim 8, wherein
the first and second nonvolatile memories receive a command by using a command reception bus from the processor via the controller,
the first and second nonvolatile memories receive an address by using a software transmission bus from the processor via the controller, and transmits one of the first to third software corresponding to the address to the processor via the controller, and
the second nonvolatile memory storing the third software is protected from being written.

11. The device of claim 1, wherein when the second software is executed by the processor, the first software is not executed by the processor.

12. The device of claim 1, wherein
when the second software is legal in the result of the verifying by the third software, the designation circuit designates the second software, and
when the second software is executed by the processor, the first software is not executed by the processor.

13. A method of controlling an information processing device,
the information processing device comprising:
a processor;
a nonvolatile memory comprising a first area, a second area, and a third area, the first area storing first software, the second area storing second software which is used as a substitute for the first software, the third area storing third software, the first and second areas being areas in which the first software in the first area and the second software in the second area are directly executable and rewritable by the processor, the third area being an area in which the third software in the third area is not rewritable by the first and second software;
a controller configured to control a writable state or a write-protected state for each of the first and second areas;
a designation circuit configured to designate software to be executed by the processor; and
a signal generator configured to generate a particular signal for permitting setting for the controller,
the method comprising:
designating, by the designation circuit, software to be executed by the processor at a boot;
starting, by the signal generator, outputting the particular signal to the controller when the designation circuit designates execution of the third software at boot of the processor;
protecting, by the controller, the first area of the nonvolatile memory storing the first software from being written while the first software is executed by the processor;
updating the second software stored in the second area by the first software when the first software is executed by the processor;
when the third software is executed by the processor, verifying, by the third software, the second software, and when the second software is legal, designating the second software as the boot software in a result of verifying the third software, setting, by the third software, the second software instead of the first software for the designation circuit, and setting, by the third software, the writable state about the first area and the write-protected state about the second area for the controller; and
executing, by the processor, the first software or the second software designated by the designation circuit after the outputting the particular signal is stopped.

14. The method of claim 13, wherein
the third software
determines whether a request to switch the software to be executed at the boot is issued by the first software when the third software is executed by the processor,
verifies the second software when the request to switch is generated, or when switching is needed, and
sets the second software for the designation circuit when the second software is legal.

15. The method of claim 14, wherein
the third software instructs the controller to protect the second area of the nonvolatile memory storing the second software from being written when the second software is legal.

16. The method of claim 13, wherein when the second software is executed by the processor, the first software is not executed by the processor.

* * * * *